(12) United States Patent
Jiang

(10) Patent No.: US 12,262,441 B2
(45) Date of Patent: Mar. 25, 2025

(54) TIMER CONTROL METHOD AND APPARATUS, ELECTRONIC DEVICE AND COMPUTER READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 482 days.

(21) Appl. No.: 17/289,944

(22) PCT Filed: Oct. 29, 2018

(86) PCT No.: PCT/CN2018/112330
§ 371 (c)(1),
(2) Date: Apr. 29, 2021

(87) PCT Pub. No.: WO2020/087198
PCT Pub. Date: May 7, 2020

(65) Prior Publication Data
US 2022/0015185 A1    Jan. 13, 2022

(51) Int. Cl.
*H04W 76/28*    (2018.01)

(52) U.S. Cl.
CPC .................. *H04W 76/28* (2018.02)

(58) Field of Classification Search
CPC . H04W 24/02; H04W 24/08; H04W 52/0216; H04W 52/0229; H04W 52/0274; H04W 76/28; H04W 76/38; H04W 24/04; H04W 24/10; H04W 56/001; H04W 72/046; H04W 76/27; H04W 80/02

USPC ....... 370/328, 252, 311, 318, 216, 329, 310, 370/400, 331, 312, 336
See application file for complete search history.

(56) References Cited

U.S. PATENT DOCUMENTS

| 8,953,509 | B2 | 2/2015 | Lee et al. |
| 2013/0107781 | A1* | 5/2013 | Lu ................ H04W 52/0216 370/311 |
| 2016/0174289 | A1 | 6/2016 | Pu et al. |
| 2016/0219443 | A1* | 7/2016 | Lee .................. H04W 24/02 |

(Continued)

FOREIGN PATENT DOCUMENTS

| CN | 104023347 A | 9/2014 |
| CN | 105722195 A | 6/2016 |

(Continued)

OTHER PUBLICATIONS

International Search Report issued in PCT Application No. PCT/CN2018/112330 dated Jul. 25, 2019 with English translation, (4p).

(Continued)

*Primary Examiner* — Joseph Arevalo
(74) *Attorney, Agent, or Firm* — Arch & Lake LLP

(57) ABSTRACT

Methods, apparatuses, and non-transitory computer-readable storage mediums are provided for timer control. The method may include suspending, when a terminal is in an discontinuous reception (DRX) active state, a currently running DRX timer in response to an interruption of a preset communication. The method may further include continuing, when the preset communication is resumed, to run the DRX timer.

20 Claims, 2 Drawing Sheets

---

When the terminal in a DRX inactive state, in response to an interruption of the preset communication on a preset cell, suspend the currently running DRX timer — S11

When the preset communication is resumed, continue to run the DRX timer — S2

(56) References Cited

U.S. PATENT DOCUMENTS

| | | | |
|---|---|---|---|
| 2018/0020382 A1* | 1/2018 | Kim | H04W 36/0064 |
| 2018/0049272 A1 | 2/2018 | Bagheri et al. | |
| 2019/0098520 A1* | 3/2019 | Kim | H04W 76/27 |
| 2020/0344835 A1* | 10/2020 | Wang | H04L 1/1896 |

FOREIGN PATENT DOCUMENTS

| | | | |
|---|---|---|---|
| CN | 108370544 A | 8/2018 | |
| EP | 2152040 A1 | 2/2010 | |
| JP | 2009171581 A | 7/2009 | |
| WO | 2013189378 A2 | 12/2013 | |

OTHER PUBLICATIONS

Extended European Search Report Issued in EP Application No. 18938922.4, Oct. 6, 2021, (9p).
ISA State Intellectual Property Office of the People's Republic of China, Written Opinion of the International Searching Authority Issued in Application No. PCT/CN2018/112330, Jul. 25, 2019, (8p).
Oppo, et al., "UE behaviour on DRX timer operation", 3GPP TSG-RAN2 #101, Athens, Greece, R2-1801758, resubmission of R2-1800073, Feb. 26-Mar. 2, 2018, (7p).
"3rd Generation Partnership Project; Technical Specification Group Radio Access Network; Evolved Universal Terrestrial Radio Access (E-UTRA); Medium Access Control (MAC) protocol specification (Release 15)", France, Oct. 1, 2018, (127p).

* cited by examiner

TIMER CONTROL METHOD AND APPARATUS, ELECTRONIC DEVICE AND COMPUTER READABLE STORAGE MEDIUM

CROSS REFERENCE TO RELATED APPLICATION

This application is a national phase application of International Application No. PCT/CN2018/112330, filed on Oct. 29, 2018, the content of which is incorporated herein by reference for all purposes.

TECHNICAL FIELD

The present disclosure relates to the field of communications technology, and in particular to timer control methods and apparatuses, electronic devices, and computer readable storage media.

BACKGROUND

To save the energy consumption of a user equipment (UE), discontinuous reception (DRX) technology is proposed in the related art, which specifically controls a UE to switch between a DRX active state and a DRX inactive state. When the UE is in the DRX active state, the UE monitors a physical downlink control channel (PDCCH); and when the UE is in the DRX inactive state, the UE does not monitor the PDCCH.

In some cases, the UE needs to be in the DRX active state to ensure that a communication of UE can be performed. For example, when a UL grant (uplink scheduling information) or a DL assignment (downlink configuration information) for new data transmission is detected by the UE on the PDCCH, the UE can start a discontinuous reception timer (DRX inactivity timer), hereinafter referred to as a DRX timer. Before expiration of the timer, the UE remains in the DRX active state, so as to ensure that the UL grant or the DL assignment for new data transmission on the PDCCH can be received successfully. After the expiration of the timer, the UE enters the DRX inactive state.

However, some reasons may cause the UE to interrupt the communication, while the DRX timer continues to run. As a result, the DRX timer has timed out after the communication resumes from the interruption, and the UE has entered the DRX inactive state without monitoring the PDCCH, which may further cause that certain communications of the UE cannot be performed successfully.

For example, the UE interrupts the monitoring on the PDCCH for some reasons, while the DRX timer continues to run during this period. When the interruption ends, the DRX timer may have timed out, which may cause the UE to enter the DRX inactive stat without monitoring the PDCCH. In this case, the UL grant or the DL assignment for new data transmission cannot be received, so that the base station cannot schedule the UE successfully.

SUMMARY

In view of this, examples of the present disclosure provide a timer control method, a timer control apparatus, an electronic device and a computer readable storage medium.

According to a first aspect of the present disclosure, a method for timer control is provided. The method may include suspending, when a terminal is in a discontinuous reception (DRX) active state, suspending a currently running DRX timer in response to an interruption of a preset communication. The method also includes continuing to run the DRX timer, when the preset communication is resumed.

According to a second aspect of the present disclosure, a computing device is provided. The computing device may include one or more processors, a non-transitory computer-readable memory storing instructions executable by the one or more processors. The one or more processors may be configured to suspend, when a terminal is in a discontinuous reception (DRX) active state, a currently running DRX timer in response to an interruption of a preset communication. The one or more processors may be further configured to continue, when the preset communication is resumed, to run the DRX timer.

According to a third aspect of the present disclosure, a non-transitory computer-readable storage medium having stored therein instructions is provided. When the instructions are executed by one or more processors, the instructions may cause the one or more processors to suspend, when a terminal is in a discontinuous reception (DRX) active state, a currently running DRX timer in response to an interruption of a preset communication. The instructions may further cause the one or more processors to continue, when the preset communication is resumed, to run the DRX timer.

BRIEF DESCRIPTION OF THE DRAWINGS

To more clearly explain the technical solutions in the embodiments of the present application, the drawings required in describing the embodiments will be briefly described below. Obviously, the drawings in the following description are only some embodiments of the present application. And a person of ordinary skill in the art can obtain other drawings based on these drawings without paying any creative effort.

DETAILED DESCRIPTION

The technical solutions in the embodiments of the present application will be described clearly and completely in conjunction with the drawings in the embodiments of the present application. Obviously, the described embodiments represent only part of the embodiments of the present application, but not all the embodiments. Based on the embodiments in the present application, all other embodiments obtained by those of ordinary skill in the art without creative effort fall within the protection scope of the present application.

Figure 1:
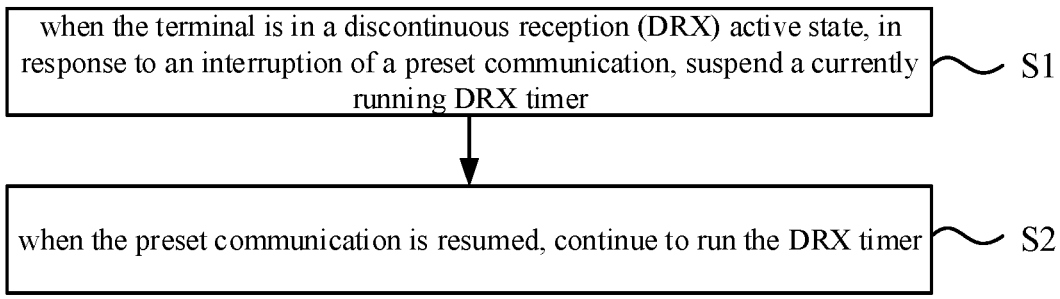
FIG. 1 is a schematic flowchart illustrating another timer control method according to an example of the present disclosure.

FIG. 1 is a schematic flowchart illustrating a timer control method according to an example of the present disclosure. The method shown in this embodiment can be applied to a terminal. The terminal can be used as a user equipment (UE) to communicate with a base station. The terminal can communicate with the base station based on 4G long term evolution (LTE) technology, or can communicate with the base station based on 5G new radio (NR) technology. The terminal can be an electronic device such as a mobile phone, a tablet computer, or a wearable device.

As shown in FIG. 1, the timer control method may include the following steps.

At step S1, when the terminal is in a discontinuous reception (DRX) active state, in response to an interruption of a preset communication, a currently running DRX timer is suspended.

At step S2, when the preset communication is resumed, the DRX timer is continued to run.

In one embodiment, when the terminal is in the DRX active state, if the UL grant or the DL assignment for new data transmission is detected on the PDCCH, the DRX timer can be started or restarted.

Multiple kinds of communications can be performed in the terminal. When a preset communication in one or more currently ongoing communications is interrupted, the terminal can suspend a currently running DRX timer, that is, pause the counting of the DRX timer.

In an embodiment, the preset communication may include a receiving operation or a sending operation, where the receiving operation may include monitoring the PDCCH, receiving data, etc., and the sending operation may include sending data and sending a physical uplink control channel (PUCCH) or a preamble of random access, etc. The following will exemplify the technical solutions of the present disclosure mainly in the case of the receiving operation, specifically monitoring the PDCCH.

As mentioned in the background, some reasons may cause the UE to interrupt the communication, while the DRX timer continues to run. As a result, the DRX timer has timed out after the communication resumes from the interruption, and the UE has entered the DRX inactive state without monitoring the PDCCH, which may further cause that certain communications of the UE cannot be performed successfully.

According to the embodiments of the present disclosure, when the preset communication is interrupted, the running DRX timer can be suspended, and when the preset communication is resumed, the DRX timer continues to run. Accordingly, it can be ensured that the DRX timer does not continue to run during the interruption of the preset communication, that is, the DRX timer only runs during the execution of the preset communication, and it is ensured that the DRX timer does not time out during the interruption of the preset communication, so that when the preset communication resumes from the interruption and continues to run, the DRX timer does not time out, that is, the UE is still in the DRX active state to monitor the PDCCH, thereby ensuring that certain communications of the UE can be executed successfully.

For example, the preset communication is PDCCH monitoring. When the PDCCH monitoring is interrupted, the DRX timer is suspended. The DRX timer continues to run only after the interruption of the PDCCH ends, so that the UE can still be in the DRX active state after an end of the interruption of the PDCCH monitoring, and the PDCCH can still be monitored, therefore the UL grant or the DL assignment for new data transmission can continue to be received. In this case, the base station can schedule the UE successfully.

Figure 2:
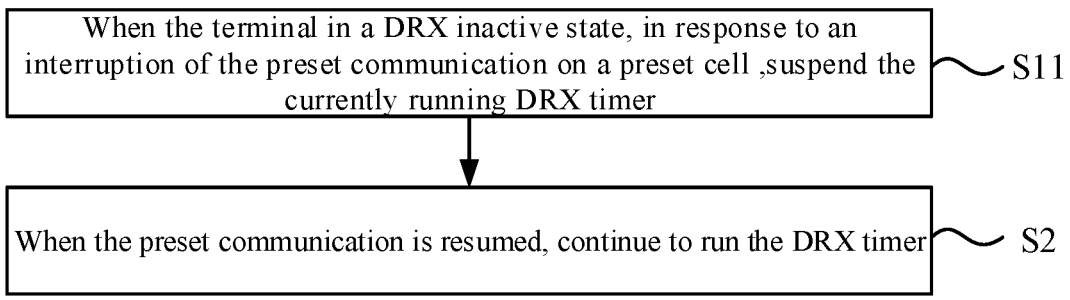
FIG. 2 is a schematic flowchart illustrating another timer control method according to an example of the present disclosure.

FIG. 2 is a schematic flowchart illustrating another timer control method according to an example of the present disclosure. As shown in FIG. 2, on the basis of the example shown in FIG. 1, the interruption of the preset communication includes the following.

At step S11, the preset communication on a preset cell is interrupted.

Optionally, the preset cell includes a primary cell and/or a primary secondary cell.

Figure 3:
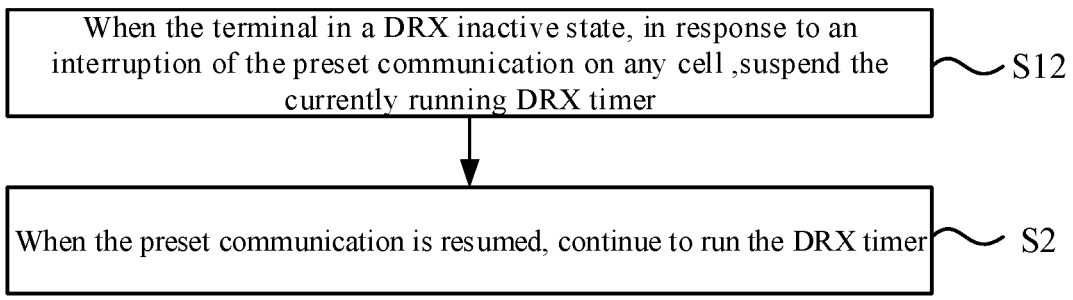
FIG. 3 is a schematic flowchart illustrating another timer control method according to an example of the present disclosure.

FIG. 3 is a schematic flowchart illustrating another timer control method according to an example of the present disclosure. As shown in FIG. 3, on the basis of the example shown in FIG. 1, the interruption of the preset communication includes the following.

At step S12, the preset communication on any cell is interrupted.

In an embodiment, multiple service cells may be configured for the terminal, including, for example, a primary cell (PCell), a primary secondary cell (PsCell), a secondary cell (SCell), and so on.

The interruption of the preset communication may refer to an interruption of the preset communication of the terminal on a preset cell. The preset cell may be determined based on information pre-stored by the terminal, or may be determined based on information configured in real time by the base station. In this case, when the preset communication of the terminal on the preset cell is interrupted, the terminal determines that the preset communication is interrupted, and a currently running DRX timer is suspended. The preset cell may generally refer to a primary cell, or may refer to a primary secondary cell (PsCell).

The interruption of the preset communication may also refer to an interruption of the preset communication of the terminal on any cell. In this case, when the preset communication of the terminal on any cell is interrupted, the terminal determines that the preset communication is interrupted, and the currently running DRX timer is suspended.

In an embodiment, different DRX timers can be configured for different cells. Then a UE suspending the currently running DRX timer may refer to that the UE suspending a DRX timer related to a cell where the UE is currently located.

Optionally, the interruption of the preset communication includes:

an interruption of the preset communication in response to receiving a BWP switching command.

In an embodiment, a reason that the preset communication is interrupted may be that the terminal receives a bandwidth part (BWP) switching command. For example, when the terminal receives a UL grant or DL assignment for new data transmission, according to the UL grant or the DL assignment, the terminal determines that BWP switching is required (that is, a BWP where an uplink resource configured by the UL grant is located is different from a BWP currently used by the terminal, or a BWP where a downlink resource configured by the DL assignment is located is different from the BWP currently used by the terminal), then the terminal needs to switch the BWP before continuing to perform the communication on the switched BWP, which causes the communication to be interrupted.

Optionally, the interruption of the preset communication includes:

an interruption of the preset communication in response to receiving an uplink carrier reconfiguration message.

In an embodiment, a reason of the interruption of the preset communication may include the terminal receiving an uplink carrier reconfiguration message. An uplink carrier may refer to a supplementary uplink carrier (SUL carrier) or a non-supplementary uplink carrier (non-SUL carrier), the reconfiguration message can be a configuration for the uplink carrier, or it can be a de-configuration for the uplink carrier.

In this case, the terminal needs to read information on an uplink carrier corresponding to the reconfiguration message. If the terminal does not support performing a preset communication on the cells corresponding to other carriers during reading the information, the preset communication performed on the cells corresponding to the other carriers may be interrupted.

Optionally, the interruption of the preset communication includes:
an interruption of the preset communication in response to receiving a message of activating or deactivating a secondary cell.

In an embodiment, when the terminal receives a message of activating or deactivating a secondary cell, the terminal needs to read information on the secondary cell. If the terminal does not support performing a preset communication on another cell when reading the information, the preset communication performed on another cell may be interrupted.

Optionally, the interruption of the preset communication includes:
an interruption of the preset communication in response to receiving a message of adding or releasing a secondary cell.

In one embodiment, when the terminal receives a message of adding or releasing a secondary cell, the terminal needs to read information on the secondary cell. If the terminal does not support performing a preset communication on another cell when reading the information, the preset communication performed on another cell may be interrupted.

Optionally, the interruption of the preset communication includes:
an interruption of the preset communication in response to a measurement gap of the terminal.

In one embodiment, the terminal can be configured with a measurement gap. During the measurement gap, the terminal can monitor signals from other cells other than a cell where the terminal is currently located. If the terminal does not support performing a preset communication on the cell where the terminal is currently located during monitoring the signals from the other cells, the preset communication performed on the cell where the terminal is currently located may be interrupted.

Optionally, the interruption of the preset communication includes:
an interruption of the preset communication in response to a switching between a DRX active state and a DRX inactive state for a primary cell in evolved universal mobile telecommunications system (UMTS) terrestrial radio access.

Optionally, the interruption of the preset communication includes:
an interruption of the preset communication in response to that a primary cell in evolved UMTS terrestrial radio access without a DRX configuration is configured with DRX.

Due to different reasons, the interruptions of the preset communication are different. Even though the interruptions of the preset communication due to the different reasons, the currently running DRX timer can be suspended according to the embodiment shown in FIG. 1, thereby ensuring that, to the greatest extent, when different interruptions of the preset communication, the currently running DRX timer can be suspended. Furthermore, it is ensured that the DRX timer does not time out after the preset communication resumes from an interruption, and the UE is still in the DRX active state to monitor the PDCCH, thereby executing certain communications for the UE successfully.

Optionally, the preset communication includes a receiving operation and/or a sending operation.

In an embodiment, the preset communication may refer to one operation or multiple operations, and the preset communication may include a receiving operation or a sending operation.

Corresponding to the embodiments of timer control methods, the present disclosure further provides embodiments of timer control apparatuses.

Figure 4:
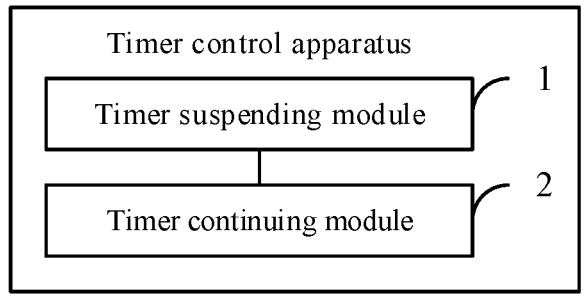
FIG. 4 is a schematic block diagram illustrating a timer control apparatus according to an example of the present disclosure.

FIG. 4 is a schematic block diagram illustrating a timer control apparatus according to an example of the present disclosure. The method shown in this embodiment can be applied to a terminal. The terminal can be used as a user equipment (UE) to communicate with a base station. The terminal can communicate with the base station based on 4G LTE technology, or can communicate with the base station based on 5G NR technology. The terminal can be an electronic device such as a mobile phone, a tablet computer, or a wearable device.

As shown in FIG. 4, the timer control apparatus includes:
a timer suspending module 1, configured to, when a terminal is in a discontinuous reception (DRX) active state, in response to an interruption of a preset communication, suspend a currently running DRX timer;
a timer continuing module 2, configured to, when the preset communication is resumed, continue to run the DRX timer.

Optionally, the interruption of the preset communication includes:
an interruption of the preset communication on a preset cell.

Optionally, the preset cell includes a primary cell and/or a primary secondary cell.

Optionally, the interruption of the preset communication includes:
an interruption of the preset communication on any cell.

Optionally, the interruption of the preset communication includes:
an interruption of the preset communication in response to receiving a BWP switching command.

Optionally, the interruption of the preset communication includes:
an interruption of the preset communication in response to receiving an uplink carrier reconfiguration message.

Optionally, the interruption of the preset communication includes:
an interruption of the preset communication in response to receiving a message of activating or deactivating a secondary cell.

Optionally, the interruption of the preset communication includes:
an interruption of the preset communication in response to receiving a message of adding or releasing a secondary cell.

Optionally, the interruption of the preset communication includes:
an interruption of the preset communication in response to a measurement gap of the terminal.

Optionally, the interruption of the preset communication includes:

an interruption of the preset communication in response to a switching between a DRX active state and a DRX inactive state for a primary cell in evolved universal mobile telecommunications system (UMTS) terrestrial radio access.

Optionally, the interruption of the preset communication includes:

an interruption of the preset communication in response to that a primary cell in evolved UMTS terrestrial radio access without a DRX configuration is configured with DRX.

Optionally, the preset communication includes a receiving operation and/or a sending operation.

The specific manners in which the respective modules of the apparatus in the above embodiments operates have been described in detail in the related method embodiments, and will not be elaborated here.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

An example of the present disclosure further provides an electronic device, including:

a processor; and a memory for storing instructions executed by the processor, where the processor is configured to perform the timer control method according to any of the examples as described above.

An example of the present disclosure further provides a computer readable storage medium having a computer program stored thereon, where the program is executed by a processor to perform steps in the timer control method according to any of the examples as described above.

Figure 5:
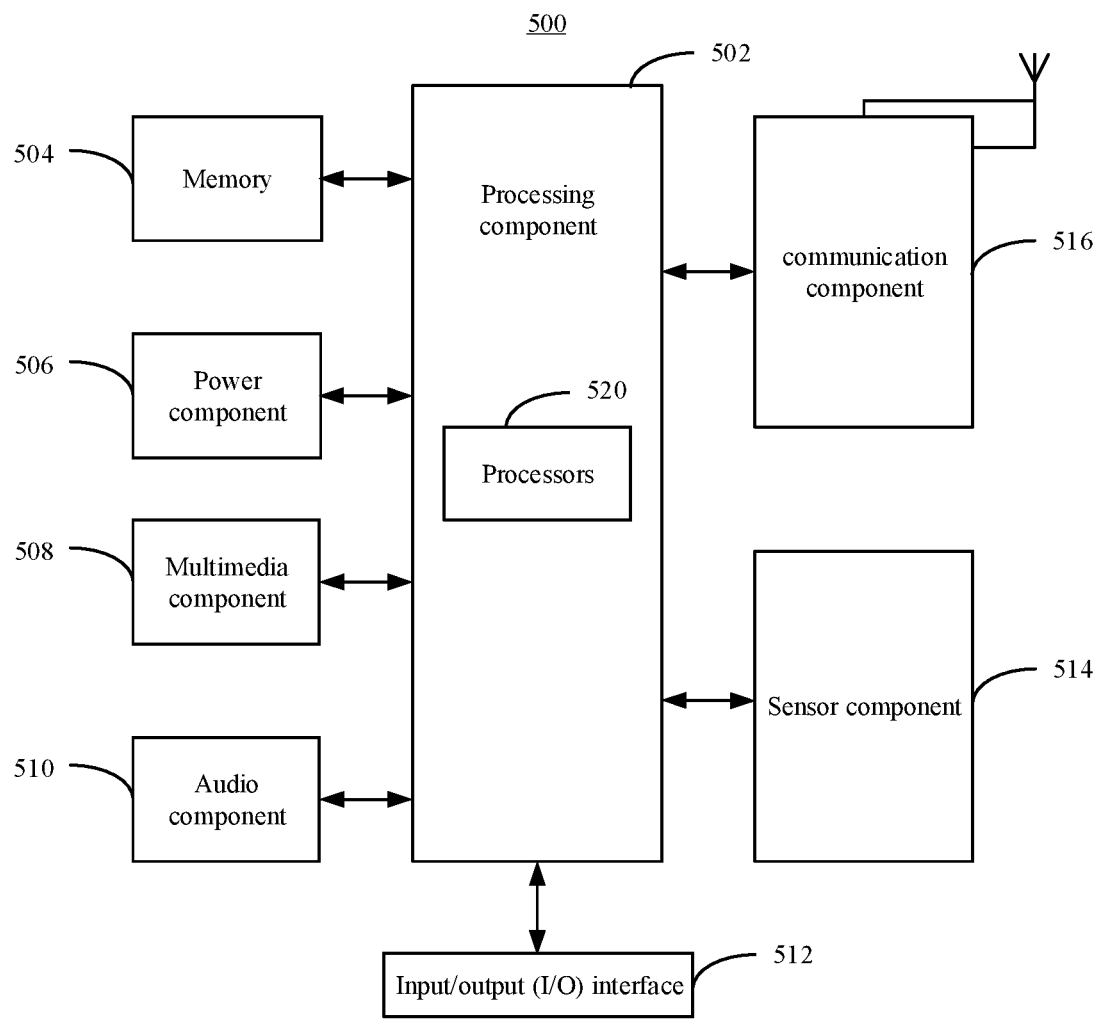
FIG. 5 is a schematic block diagram illustrating a timer control apparatus according to an example of the present disclosure.

FIG. 5 is a schematic block diagram illustrating a timer control apparatus 500 according to an example of the present disclosure. For example, apparatus 500 may be a mobile phone, a computer, a digital broadcasting terminal, a messaging device, a game console, a tablet device, a medical device, a fitness device, a personal digital assistant, etc.

Referring to FIG. 5, the apparatus 500 may include one or more of the following components: a processing component 502, a memory 504, a power component 506, a multimedia component 508, an audio component 910, an input/output (I/O) interface 912, a sensor component 514, and a communication component 516.

The processing component 502 usually controls the overall operation of the apparatus 500, such as operations associated with display, telephone calls, data communications, camera operations, and recording operations. The processing component 502 may include one or more processors 520 to execute instructions to complete all or part of the steps of the above methods. Moreover, the processing component 502 may include one or more modules to facilitate interaction between the processing component 502 and other components. For example, the processing component 502 may include a multimedia module to facilitate the interaction between the multimedia component 508 and the processing component 502.

The memory 504 is to store various types of data to support the operation of the apparatus 500. Examples of these data include instructions for any application or method operating at the apparatus 500, contact data, phone book data, messages, pictures, videos, and the like. The memory 504 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 506 provides power to various components of the apparatus 500. The power component 506 may include a power management system, one or more power sources, and other components associated with power generated, managed, and distributed for the apparatus 500.

The multimedia component 508 includes a screen that provides an output interface between the apparatus 500 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 508 includes a front camera and/or a rear camera. The front camera and/or rear camera may receive external multimedia data when the apparatus 500 is in an operating mode, such as a photographing mode or a video mode. Each of the front and rear cameras may be a fixed optical lens system or have a focal length and an optical zoom capability.

The audio component 510 is configured to output and/or input audio signals. For example, the audio component 510 includes a microphone (MIC) configured to receive an external audio signal when the apparatus 500 is in an operation mode, such as a call mode, a recording mode, and a voice recognition mode. The received audio signal may be further stored in the memory 504 or transmitted via the communication component 516. In some examples, the audio component 510 also includes a loudspeaker for outputting an audio signal.

The I/O interface 512 provides an interface between the processing component 502 and a peripheral interface module which may be a keyboard, a click wheel, a button, or the like. These buttons may include, but are not limited to a home button, a volume button, a start button, and a lock button.

The sensor component 514 includes one or more sensors for providing a status assessment in various aspects to the apparatus 500. For example, the sensor component 514 may detect the on/off status of the apparatus 500, and relative positioning of component, for example, the component is a display and a keypad of the apparatus 500. The sensor component 514 may also detect a change in position of the apparatus 500 or a component of the apparatus 500, a presence or absence of the contact between a user and the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some examples, the sensor component 514 may also include an acceleration sensor, a gyro sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 2G or 3G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing a message sending method according to any of the examples as described above.

In an example, there is also provided a non-transitory computer-readable storage medium including instructions, such as a memory 504 including instructions, where the instructions are executable by the processor 520 of the apparatus 500 to implement the method as described above. For example, the non-transitory computer-readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The methods and apparatuses provided by the embodiments of the present disclosure have been described in detail above. Specific examples are used to explain the principles and implementations of the present disclosure. At the same time, those of ordinary skill in the art may apply some changes in the specific implementation and the scope of application based on the idea of the present disclosure. In conclusion, the content of the present specification should not be construed as any limitation to the present disclosure.

The invention claimed is:

1. A method for timer control, comprising;
   starting a discontinuous reception (DRX) timer, wherein a terminal retains in a DRX active state before expiration of the DRX timer to ensure that a preset communication is performed and enters a DRX inactive state after the expiration of the DRX timer;
   in response to an interruption of the preset communication, suspending the DRX timer that is currently running to avoid the DRX timer from timing out during the interruption of the preset communication; and
   in response to a resumption of the preset communication, continuing to run the DRX timer to keep the terminal in the DRX active state.

2. The method of claim 1, wherein the interruption of the preset communication comprises:
   an interruption of the preset communication on a preset cell.

3. The method of claim 2, wherein the preset cell comprises at least one of a primary cell or a primary secondary cell.

4. The method of claim 1, wherein the interruption of the preset communication comprises:
   an interruption of the preset communication on any cell.

5. The method of claim 1, wherein the interruption of the preset communication comprises:
   an interruption of the preset communication in response to receiving a bandwidth part (BWP) switching command.

6. The method of claim 1, wherein the interruption of the preset communication comprises:
   an interruption of the preset communication in response to receiving an uplink carrier reconfiguration message.

7. The method of claim 1, wherein the interruption of the preset communication comprises:
   an interruption of the preset communication in response to receiving a message of activating or deactivating a secondary cell.

8. The method of claim 1, wherein the interruption of the preset communication comprises:
   an interruption of the preset communication in response to receiving a message of adding or releasing a secondary cell.

9. The method of claim 1, wherein the interruption of the preset communication comprises:
   an interruption of the preset communication in response to a measurement gap of the terminal.

10. The method of claim 1, wherein the interruption of the preset communication comprises:
    an interruption of the preset communication in response to switching between a DRX active state and a DRX inactive state for a primary cell in evolved universal mobile telecommunications system (UMTS) terrestrial radio access.

11. The method of claim 1, wherein the preset communication comprises at least one of a receiving operation or a sending operation.

12. An electronic device, comprising:
one or more processors; and
a non-transitory computer-readable storage medium storing instructions executable by the one or more processors,
wherein the one or more processors are configured to:
start a discontinuous reception (DRX) timer, wherein a terminal retains in a DRX active state before expiration of the DRX timer to ensure that a preset communication is performed and enters a DRX inactive state after the expiration of the DRX timer;
in response to an interruption of the preset communication, suspend the DRX timer that is currently running to avoid the DRX timer from timing out during the interruption of the preset communication; and
in response to a resumption of the preset communication, continue to run the DRX timer to keep the terminal in the DRX active state.

13. The electronic device of claim 12, wherein the interruption of the preset communication comprises:
an interruption of the preset communication on a preset cell.

14. The electronic device of claim 13, wherein the preset cell comprises at least one of a primary cell or a primary secondary cell.

15. The electronic device of claim 12, wherein the interruption of the preset communication comprises:
an interruption of the preset communication on any cell.

16. The electronic device of claim 12, wherein the interruption of the preset communication comprises:
an interruption of the preset communication in response to receiving a bandwidth part (BWP) switching command.

17. The electronic device of claim 12, wherein the interruption of the preset communication comprises:
an interruption of the preset communication in response to receiving an uplink carrier reconfiguration message.

18. The electronic device of claim 12, wherein the interruption of the preset communication comprises:
an interruption of the preset communication in response to receiving a message of activating or deactivating a secondary cell.

19. The electronic device of claim 12, wherein the interruption of the preset communication comprises:
an interruption of the preset communication in response to receiving a message of adding or releasing a secondary cell.

20. A non-transitory computer readable storage medium storing a plurality of programs for execution by a computing device having one or more processors, wherein the plurality of programs, when executed by the one or more processors, cause the computing device to perform acts comprising:
starting a discontinuous reception (DRX) timer, wherein a terminal retains in a DRX active state before expiration of the DRX timer to ensure that a preset communication is performed and enters a DRX inactive state after the expiration of the DRX timer;
in response to an interruption of the preset communication, suspend the DRX timer that is currently running to avoid the DRX timer from timing out during the interruption of the preset communication; and
in response to a resumption of the preset communication, continue to run the DRX timer to keep the terminal in the DRX active state.

* * * * *